(12) United States Patent
Maier

(10) Patent No.: US 8,056,483 B2
(45) Date of Patent: Nov. 15, 2011

(54) CABLE OR PIPELINE TROLLEY FOR TRAVELING ALONG A CARRIER RAIL

(75) Inventor: Bernd Maier, Schliengen (DE)

(73) Assignee: Conductix-Wampfler AG, Weil am Rhein-Markt (DE)

( * ) Notice: Subject to any disclaimer, the term of this patent is extended or adjusted under 35 U.S.C. 154(b) by 418 days.

(21) Appl. No.: 12/162,623

(22) PCT Filed: Dec. 16, 2006

(86) PCT No.: PCT/EP2006/012153
§ 371 (c)(1),
(2), (4) Date: Dec. 3, 2008

(87) PCT Pub. No.: WO2007/087873
PCT Pub. Date: Aug. 9, 2007

(65) Prior Publication Data
US 2009/0301341 A1 Dec. 10, 2009

(30) Foreign Application Priority Data
Feb. 2, 2006 (DE) .......................... 10 2006 004 722

(51) Int. Cl.
*B61B 3/00* (2006.01)
(52) U.S. Cl. .......................... 105/148; 105/153; 105/154
(58) Field of Classification Search .................. 105/148, 105/150, 153, 154; 104/89, 93, 95
See application file for complete search history.

(56) References Cited

U.S. PATENT DOCUMENTS

| 4,093,047 A | 6/1978 | Wampfler | |
|---|---|---|---|
| 5,711,228 A * | 1/1998 | Itzin et al. | 105/154 |

(Continued)

FOREIGN PATENT DOCUMENTS

DE 247 498 3/1912

(Continued)

OTHER PUBLICATIONS

International Search Report for PCT/EP2006/012153; Published on Aug. 9, 2007.

(Continued)

*Primary Examiner* — Joe Morano, IV
*Assistant Examiner* — Zachary Kuhfuss
(74) *Attorney, Agent, or Firm* — Martin Fleit; Paul D. Bianco; Fleit Gibbons Gutman Bongini & Bianco PL

(57) ABSTRACT

The invention relates to a cable or pipeline trolley (2) for travelling along a carrier rail, comprising at least one chassis (1) and a carrier device (10) for cables or pipelines, in addition to a central plate (9) that connects the carrier device (10) to the chassis (1). Known cable or pipeline trolleys of this type are sensitive to high winds and are frequently derailed from the guides as a result of the large wind-exposure area. The aim of the invention is to develop a cable or pipeline trolley so that it is more operationally secure and the chassis can run more reliably along the carrier rail even when exposed to high winds or other stress. To achieve this, at least two rectangular cavities and two triangular cavities (6, 7) are positioned within the outer boundary of the central plate (9), said cavities being symmetrical in relation to the central axis of the central plate and being separated by a strut.

12 Claims, 2 Drawing Sheets

U.S. PATENT DOCUMENTS

| | | | |
|---|---|---|---|
| 6,109,199 A | | 8/2000 | Wallach et al. |
| 6,164,210 A | * | 12/2000 | Coslovi et al. ............... 105/396 |
| 2009/0301341 A1 | * | 12/2009 | Maier ............................ 104/89 |

FOREIGN PATENT DOCUMENTS

| | | |
|---|---|---|
| DE | 7114492 | 4/1971 |
| DE | 2628112 | 1/1978 |
| DE | 4436520 | 9/1995 |
| DE | 4437519 | 11/1995 |
| DE | 4436519 | 4/1996 |
| DE | EP2103562 A1 * | 2/2009 |
| WO | WO 2007/087873 | 8/2007 |

OTHER PUBLICATIONS

International Preliminary Examination Report for PCT/EP2006/012153; Published on Aug. 2, 2008.

English Translation of the Preliminary Examination Report for PCT/EP2006/012153; Published on Sep. 22, 2008.

Written Opinion for PCT/EP2006/012153; Published on Aug. 2, 2008.

* cited by examiner

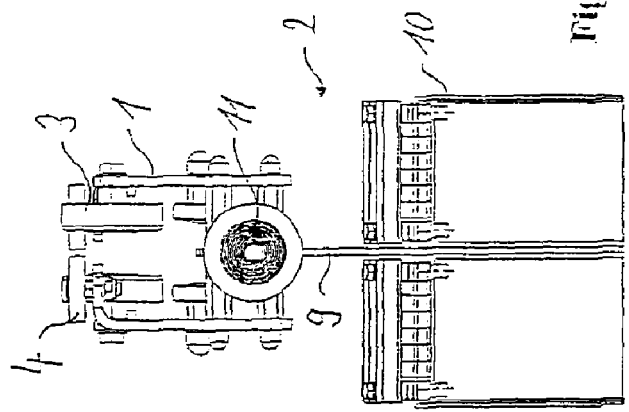
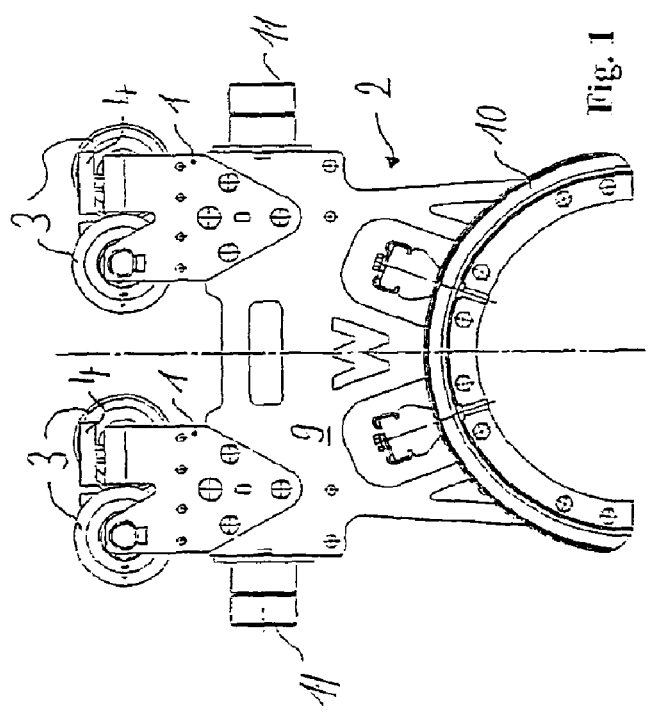
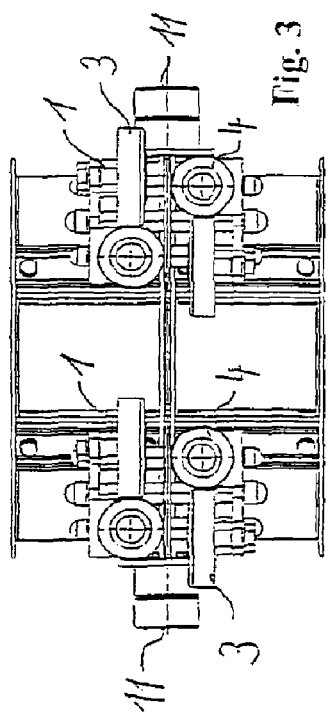

CABLE OR PIPELINE TROLLEY FOR TRAVELING ALONG A CARRIER RAIL

FIELD OF THE INVENTION

The invention pertains to a cable or pipeline trolley for traveling along a carrier rail.

BACKGROUND OF THE INVENTION

Known cable or pipeline trolleys of this type form the object, for example, of publications DE 44 36 520 C1, which describes a powered cable or pipeline trolley, and DE 44 37 519 C2, as well as publications DE-GM 71 14 492 and DE 26 28 112 C2 referred to therein. Other cable or pipeline trolleys of this type are disclosed in publications DE 44 36 520 C1 and DE-PS 247 498.

The cable or pipeline trolleys of the initially cited type described in these publications serve for transporting power lines and/or gas conduits to movable consumers such as, e.g., the traveling trolley of a crane that travels on a carrier rail or in any other arrangements, e.g., trailing cable arrangements. In this case, the power lines or gas conduits need to follow a movable consumer, wherein this is realized with a multitude of such cable or pipeline trolleys that travel on a carrier rail similar to the end consumer (such as, e.g., the crane trolley).

Known cable or pipeline trolleys of this type usually consist of at least one chassis that is arranged directly on the carrier rail and travels thereon, a central plate that is arranged on the chassis in a suspended fashion and the actual carrier device for the cables or pipelines that is arranged on the bottom of the central plate. These known carrier devices have the disadvantage that they tilt laterally during high winds as frequently occur on elevated trailing cable devices, e.g., on bridge cranes in coastal areas, because one side of the very rigid central plate forms a large wind exposure area and the central plate can be barely bent, i.e., it has a very low flexibility. This causes the chassis to derail from the guides. Although the cable or pipeline trolley cannot fall out because it is fixed on the left side and the right side along the double-T beam that is also referred to as an I-beam, it may jam and thusly lead to collisions between adjacent cable or pipeline trolleys.

SUMMARY OF THE INVENTION

The invention therefore is based on the objective of additionally developing a cable or pipeline trolley of the initially cited type in such a way that its operational reliability is improved and the chassis can travel along the carrier rail more securely, namely also under wind loads and other stresses.

This objective is attained with the characterizing features of the trolley described herein. Advantageous embodiments of the invention are disclosed in the drawings and description herein.

One embodiment of the invention is described in greater detail below with reference to the accompanying drawings, which show:

BRIEF DESCRIPTION OF THE DRAWINGS

FIG. 1: a side view of an inventive cable or pipeline trolley;
FIG. 2: a front view of the cable or pipeline trolley according to FIG. 1;
FIG. 3: a top view of the cable or pipeline trolley according to FIGS. 1 and 2, and
FIG. 4: a separate illustration of the central plate used in the cable or pipeline trolley according to FIGS. 1-3.

DETAILED DESCRIPTION OF THE INVENTION

Figure 4:
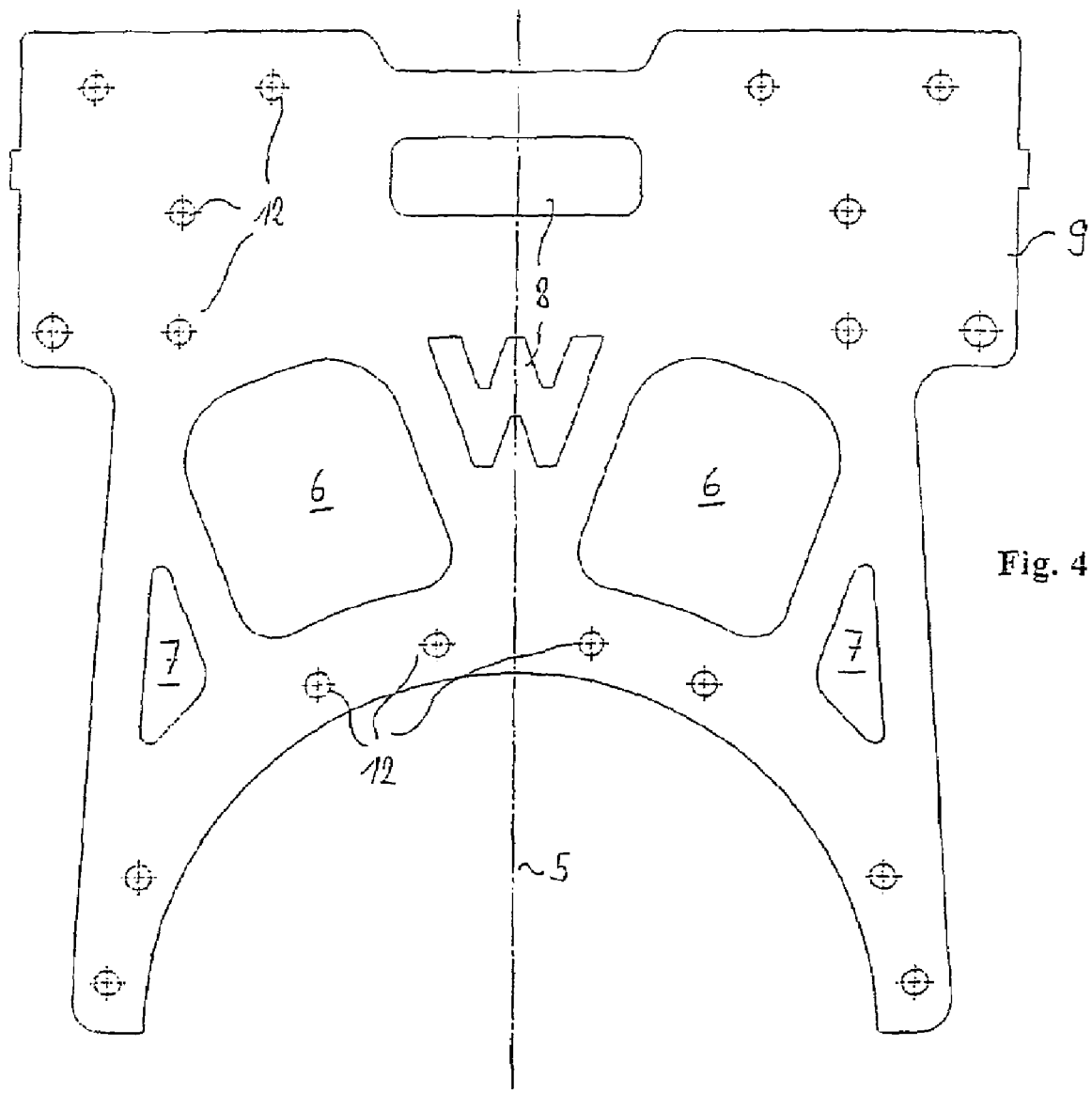

FIGS. 1-3 show a cable or pipeline trolley, the upper side of which features two chassis (1) that are connected to an essentially planar central plate (9) by means of screw connections and support this central plate in a suspended fashion, wherein the central plate is connected to the actual carrier device (10) for the (not-shown) supply lines on its lower side, namely also by means of screw connections. Each chassis (1) features two support rolls (3) with essentially horizontal axis of rotation and two guide rolls (4) with essentially vertical axis of rotation. The front and rear ends of the central plate (9) referred to the driving direction are provided with cellular buffers (11) for mutually supporting and for absorbing shocks in case adjacent cable or pipeline trolleys (2) collide with one another.

The central plate (9) is illustrated separately and in the dismounted state in FIG. 4. In contrast with central plates known from the state of the art, it features a number of cavities (6, 7 and 8) that collectively amount to at least 10% of its surface. This figure clearly shows large cavities (6) that are arranged adjacent and symmetrical to the central axis (5) of the central plate (9) and essentially have a rectangular (almost square) shape with rounded corners. These two large cavities (6) are arranged symmetrically referring to the central axis (5), namely viewed from the underside of the central plate (9) to its upper side, and are tilted outward referring to the central axis (5). Two smaller cavities (7) of essentially triangular shape are also arranged symmetrically to the central axis (5) outward and downward from these two larger cavities (6), i.e., toward the carrier device (10).

A W-shaped cavity is situated between the two larger cavities (6) and an elongated rectangular cavity is arranged on top thereof, i.e., assigned to the chassis (1). The two latter cavities are identified by the reference numeral 8. They are also arranged symmetrically referring to the central axis (5) and are intersected thereby. The elongated rectangular cavity identified by the reference numeral 8 also serves for accommodating a (not-shown) lifting device. During a required exchange of the support rolls 3, such a lifting device (e.g., a hydraulic lifting device) is able to lift the entire cable or pipeline trolley 2. This unburdens the support rolls 3 such that they can be exchanged without removing the lateral shield. Due to the attained time saving, this represents a significant advantage in practical applications.

Due to the multitude of cavities (6, 7 and 8) and the small remaining plate area, except in the regions that contain the screw connections (12) for respectively connecting the central plate (9) to the carrier device (10) and the chassis (1), only relatively little material exists that could form a wind exposure surface and cause an excessively high stiffness of the central plate (9). Consequently, the wind is able to pass through the central plate (9) provided with the cavities in an essentially unhindered fashion. Even if the central plate (9) bends due to wind loads or other forces generated during its operation, it does not resist this bending motion, but rather bends flexibly such that the entire force acting upon the central plate (9) is not transmitted to the chassis (1) and the support rolls (3) remain in the track longer, namely also when the central plate (9) is subjected to forces, and the chassis (1) roll more cleanly along the carrier rails.

Due to the improved and more controlled flow of forces, the supports are unburdened, and the weight reduction achieved with the numerous cavities (6, 7 and 8) results in reduced running noise.

The invention claimed is:

1. A cable or pipeline trolley for traveling along a carrier rail comprising:
   - at least one chassis;
   - a carrier device; and
   - a central plate connecting said carrier device with said chassis, positioned coplanar with driving direction of the cable or pipeline trolley and including a plurality of apertures formed over at least 10% of a surface area of said central plate, wherein at least one of said plurality of apertures is a W-shaped aperture and each aperture is operable to enable air to flow through said central plate to thereby reduce a twisting of said central plate due to wind forces.

2. The cable or pipeline trolley according to claim 1, wherein at least two of the plurality of apertures are rectangular shaped and at least two of the plurality of apertures are triangular shaped.

3. The cable or pipeline trolley according to claim 2, wherein said rectangular shaped apertures are arranged symmetrically with respect to a central axis defined longitudinally through a center of the central plate, and said triangular apertures are arranged symmetrically with respect to the central axis.

4. The cable or pipeline trolley according to claim 3, wherein said rectangular apertures are positioned closer to the central axis of the central plate relative to the triangular apertures.

5. The cable or pipeline trolley according to claim 1, wherein said W-shaped aperture is situated on a central axis defined longitudinally through a center of the central plate.

6. The cable or pipeline trolley according to claim 1, wherein the central plate has a total of six apertures.

7. A cable or pipeline trolley for traveling along a carrier cable or rail comprising:
   - at least one chassis;
   - a carrier device;
   - a central plate connecting said carrier device with said chassis, positioned coplanar with driving direction of the cable or pipeline trolley and including a plurality of apertures formed over at least about 10% of a surface area of said central plate, each aperture operable to admit passage of wind through said central plate to thereby reduce a twisting of said central plate due to wind forces; and
   - a lifting aperture engageable with a lifting device whereby said trolley may be lifted.

8. The cable or pipeline trolley according to claim 7, wherein at least two of the plurality of apertures are rectangular shaped and arranged symmetrically with respect to a central axis defined longitudinally through a center of the central plate, and at least two of the plurality of apertures are triangular shaped and arranged symmetrically with respect to the central axis.

9. The cable or pipeline trolley according to claim 8, wherein said rectangular apertures are positioned closer to the central axis of the central plate relative to the triangular apertures.

10. The cable or pipeline trolley according to claim 7, wherein said central plate further includes a W-shaped aperture operable to admit passage of wind through said central plate.

11. The cable or pipeline trolley according to claim 10, wherein said W-shaped aperture is situated on a central axis defined longitudinally through a center of the central plate.

12. The cable or pipeline trolley according to claim 7, wherein the central plate has at least six apertures.

* * * * *